United States Patent
Liu et al.

(10) Patent No.: US 10,015,696 B2
(45) Date of Patent: Jul. 3, 2018

(54) ROBUST PBCH-IC METHOD IN LTE ADVANCED

(71) Applicant: Telefonaktiebolaget LM Ericsson (publ), Stockholm (SE)

(72) Inventors: Peng Liu, Beijing (CN); Jing Ma, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 15/313,655

(22) PCT Filed: Jun. 11, 2014

(86) PCT No.: PCT/CN2014/079685
§ 371 (c)(1),
(2) Date: Nov. 23, 2016

(87) PCT Pub. No.: WO2015/188337
PCT Pub. Date: Dec. 17, 2015

(65) Prior Publication Data
US 2017/0215103 A1    Jul. 27, 2017

(51) Int. Cl.
H04W 28/04 (2009.01)
H04W 24/02 (2009.01)

(52) U.S. Cl.
CPC .......... *H04W 28/04* (2013.01); *H04W 24/02* (2013.01); *H04W 28/048* (2013.01)

(58) Field of Classification Search
CPC .... H04W 28/04; H04W 28/048; H04W 24/02
See application file for complete search history.

(56) References Cited

U.S. PATENT DOCUMENTS

2002/0111142 A1* 8/2002 Klimovitch ............ H04B 7/005
455/67.11
2011/0267937 A1 11/2011 Yoo et al.
(Continued)

FOREIGN PATENT DOCUMENTS

CN       102959894 A    3/2013
WO     2011051746 A1    5/2011
(Continued)

OTHER PUBLICATIONS

Ericsson, ST-Ericsson; "NAIC Reference receivers" 3GPP-R4-131643 TSG-RAN WG4 Meeting #66bis Chicago, Illinois, USA, Apr. 15-19, 2013, server date Apr. 8, 2013, XP050701799.
(Continued)

*Primary Examiner* — Andrew Lai
*Assistant Examiner* — Harry H Kim
(74) *Attorney, Agent, or Firm* — Sage Patent Group (57) ABSTRACT

A Physical Broadcast Channel (PBCH) Interference Cancellation (PBCH-IC) solution is presented herein. The PBCH-IC provides accurate and efficient techniques for cancelling interference from a serving cell PBCH. In one embodiment, PBCH symbols previously determined for an aggressor cell are canceled from a PBCH sequence currently received by the wireless device to produce a serving cell PBCH free of interference. In another embodiment, the PBCH symbols of the aggressor cell are reconstructed in the frequency domain and converted to the time domain to generate an aggressor PBCH sequence. The aggressor PBCH sequence is then subtracted from the received PBCH sequence to cancel the aggressor cell interference.

28 Claims, 7 Drawing Sheets

(56) References Cited

U.S. PATENT DOCUMENTS

| | | | |
|---|---|---|---|
| 2013/0107785 A1 | 5/2013 | Bhattad et al. | |
| 2013/0114437 A1* | 5/2013 | Yoo | H04J 11/005 370/252 |
| 2013/0176779 A1 | 7/2013 | Chen et al. | |
| 2014/0112404 A1 | 4/2014 | Eder et al. | |
| 2015/0078257 A1 | 3/2015 | Wu et al. | |
| 2015/0358100 A1* | 12/2015 | Jung | H04J 11/005 370/329 |

FOREIGN PATENT DOCUMENTS

| | | |
|---|---|---|
| WO | 2012058197 A1 | 5/2012 |
| WO | 2013000820 A1 | 1/2013 |
| WO | 2013067253 A1 | 5/2013 |
| WO | WO 2013/174050 A1 | 11/2013 |
| WO | 2013185854 A1 | 12/2013 |
| WO | WO 1996/11534 A2 | 3/2015 |

OTHER PUBLICATIONS

Supplementary European Search Report EP application No. 14894725.2 dated Jan. 16, 2018.

Rajeswan, "Performance Analysis of Pilot Aided Channel Estimation Methods for LTE System in Time-Selective Channels," 5th International Conference on Industrial and Information Systems (ICIIS), India, Jul. 29-Aug. 1, 2010, pp. 113-118, XP031758274, IEEE, Picscataway, NJ, USA.

Nagate, "Cell Edge Throughput Improvement by Base Station Cooperative Transmission Control with Reference Signal Interference Caneller in LTE System," IEEE 75th Vehicular Technology Conference (VTC Srping) , Spring 2012, pp. 1-5, XP032202499.

* cited by examiner

ROBUST PBCH-IC METHOD IN LTE ADVANCED

TECHNICAL FIELD

The invention disclosed herein relates generally to aggressor cell interference on a physical broadcast channel (PBCH) of a serving cell, and more particularly to techniques for cancelling such aggressor cell interference from a PBCH sequence received by a wireless device.

BACKGROUND

With the growing number of users and demand of bandwidth, traditional macro cell can barely meet performance requirements. To help address this, $3^{rd}$ Generation Partnership Project (3GPP) Long Term Evolution (LTE) networks introduced a low power node (LPN) cell, such as a picocell, femtocell, etc. A picocell covers a small cellular area, such as buildings (offices, shopping malls, train stations, stock exchanges, etc.), aircraft, etc. Picocells are typically used to extend coverage to indoor areas where outdoor signals do not reach well. Picocells may also add network capacity in areas with very dense phone usage, e.g., train stations, public squares, etc. Femtocells are typically designed for use in a home or small business. Femtocells differ from picocells in that they are intended to be much more autonomous. For example, femtocells tend to be self-installed by the end user in their home or office, primarily for their own benefit.

Such LPNs enable LTE network topology, e.g., a heterogeneous network (HetNet), to become more flexible. A HetNet comprises macro cells overlaid with femtocells, picocells and other LPN cells, which can satisfy the operators burgeoning traffic demands through cell-splitting gains obtained by bringing UE closer to their access points. Employing HetNet, however, presents numerous challenges. For example, user equipments (UEs) in a HetNet, especially those UEs at a cell edge, receive two or more intra-frequency signals simultaneously. If the received signals are strong, the UEs will suffer severe inter-cell interference when receiving the serving cell signal. Such interference will degrade the user experience.

In HetNet, the number of UEs connected to a picocell is much smaller than the number connected to a macrocell, which results in inefficient resource utilization. Therefore, it is beneficial for a network to bias handover preferentially towards picocells. Such a bias, e.g., may be achieved by adding an offset to the picocell Reference Signal Received Power (RSRP) so that UEs can select a picocell even if it is not the strongest cell. This technology is referred to as a Cell Range Extension (CRE). Due to the preferential biasing, CRE may increase the radio range of a picocell, and may enable a macrocell to offload more UEs to a picocell.

However, the introduction of CREs may further aggravate the inter-cell interference problem. For example, a picocell signal received by the UEs in the CRE zone may have heavy interference from one or more aggressor cells (e.g., a femtocell, a macrocell, etc.) because the aggressor cell signal is still strong, and perhaps is even stronger than the picocell signal.

To solve the intra-frequency interference problem in HetNet, the 3GPP Release 10 specification introduced Enhanced Inter-Cell Interference Coordination (eICIC). eICIC redefines an additional time dimension, which allows the signals from different cells to be orthogonal in the time domain. The use of this additional time dimension is referred to as Almost Blank Subframe (ABS). ABS only includes the necessary signals and channels for compatibility with UEs of 3GPP Release 8/9, e.g., the Primary Synchronization Signal/Secondary Synchronization Signal (PSS/SSS), Physical Broadcast Channel (PBCH), Cell-specific Reference Signal (CRS), System Information Block 1 (SIB1), etc. eICIC configures the ABS in the aggressor cell, and these ABSs are used by the serving cell to provide service for the UEs served by the serving cell that previously experienced strong interference from the aggressor cell(s). In this way, the inter-cell interference problems can be well managed.

As noted above, the ABS broadcasts the PBCH. The PBCH carries a Master Information Block (MIB), and consists of a limited number of the most frequently transmitted parameters essential for the UE to gain initial access to the cell. For example, the MIB may carry four pieces of important system information: the transmit antenna port number, the system bandwidth, the System Frame Number (SFN), and the Physical Hybrid Automatic Repeat reQuest (ARQ) Indicator Channel (PHICH) indicator. The PBCH is designed for early detection by the UE, and cell-wide coverage. When the cells are synchronized at the frame level, however, PBCH(s) transmitted by aggressor cell(s) will overlap the serving cell PBCH. As a result, aggressor cell PBCH(s) will interfere with the serving cell PBCH. For example, when the UEs are all located in a CRE zone, the interference can be 9 dB stronger than the wanted signals (worst case), which will degrade the PBCH performance severely.

If the UE cancels the aggressor cell PBCH(s) from the received PBCH, the UE can obtain an interference free representation of the serving cell PBCH. The UE can use such an interference free serving cell PBCH to improve the detection of the PBCH. Therefore, PBCH Interference Cancellation (PBCH-IC) is desirable for HetNet.

SUMMARY

The solution presented herein provides accurate and efficient techniques for cancelling interference from a received Physical Broadcast Channel (PBCH). In one embodiment, a PBCH sequence previously determined for an aggressor cell is canceled from a PBCH sequence currently received by the wireless device to produce a serving cell PBCH free of interference. In another embodiment, the PBCH symbols of the aggressor cell are reconstructed in the frequency domain and converted to the time domain to generate an aggressor PBCH sequence. The aggressor PBCH sequence is subtracted from the received PBCH sequence to cancel the aggressor cell interference.

One exemplary embodiment comprises a method of cancelling aggressor cell interference, in a wireless device, from a physical broadcast channel (PBCH) sequence received by a wireless device from a serving cell and an aggressor cell using a joint frequency domain and time domain process, wherein the serving cell comprises a serving network node that serves the wireless device. The method comprises applying a denoise process to channel estimates associated with the aggressor cell in the time domain to remove noise from the channel estimates to determine denoised channel estimates, and converting the denoised channel estimates from the time domain to the frequency domain to determined denoised frequency domain channel estimates. The method further comprises determining generated PBCH symbols for the aggressor cell based on a master information block corresponding to the aggressor cell in the received PBCH sequence. In addition, the method comprises reconstructing aggressor PBCH symbols for the aggressor cell in the frequency domain based on the denoised frequency domain channel estimates and the generated PBCH symbols, and converting the reconstructed aggressor PBCH symbols from the frequency domain to the time domain to generate a reconstructed PBCH sequence. The method further comprises subtracting the reconstructed PBCH sequence from the received PBCH sequence in the time domain to cancel the aggressor cell interference.

Another exemplary embodiment comprises a wireless device served in a wireless network by a serving network node in a serving cell. The wireless device comprises a receiver circuit, denoising circuit, reconstruction circuit, conversion circuit, and cancellation circuit. The receiver circuit is configured to receive a physical broadcast channel (PBCH) sequence from the serving cell and an aggressor cell. The denoising circuit is configured to apply a denoise process to channel estimates in the time domain to remove noise from the channel estimates to determine denoised channel estimates, and convert the denoised channel estimates to the frequency domain to determined denoised frequency domain channel estimates. The reconstruction circuit is configured to determine generated PBCH symbols for the aggressor cell based on a master information block corresponding to the aggressor cell in the received PBCH sequence, and reconstruct aggressor PBCH symbols for the aggressor cell in the frequency domain based on the denoised frequency domain channel estimates and the generated PBCH symbols. The conversion circuit is configured to convert the reconstructed aggressor PBCH symbols from the frequency domain to the time domain to generate a reconstructed PBCH sequence. The cancellation circuit is configured to subtract the reconstructed PBCH sequence from the received PBCH sequence in the time domain to cancel the aggressor cell interference.

Another exemplary embodiment provides a method of cancelling interference, in a wireless device, from a current physical broadcast channel (PBCH) sequence received by a wireless device from a serving cell and an aggressor cell using a joint frequency domain and time domain process. A serving network node in the serving cell serves the wireless device. The method comprises converting the received current PBCH sequence from a time domain to a frequency domain to generate current PBCH symbols, and retrieving first reconstructed PBCH symbols associated with the aggressor cell for each subcarrier of the PBCH from memory in the wireless device. The first reconstructed PBCH symbols are determined for the aggressor cell before receipt of the current PBCH sequence by the wireless device. The method further comprises correlating each of the first reconstructed PBCH symbols with the current PBCH symbols to determine a correlation factor for each of the subcarriers, and determining a peak-to-average ratio (PAR) of a power of the correlation factors based on the correlation factors. If the PAR exceeds a threshold, the method comprises cancelling aggressor cell interference from the current PBCH symbols based on the first reconstructed PBCH symbols.

Another exemplary embodiment comprises a wireless device served in a wireless network by a serving network node in a serving cell. The wireless device comprises a memory, a receiver, a correlation circuit, a parameter circuit, and a cancellation circuit. The receiver is configured to receive a current physical broadcast channel (PBCH) sequence from the serving cell and an aggressor cell, and to convert the received current PBCH sequence from a time domain to a frequency domain to generate current PBCH symbols. The correlation circuit is configured to retrieve first reconstructed PBCH symbols associated with the aggressor cell for each subcarrier of the PBCH from the memory. The first reconstructed PBCH symbols are determined for the aggressor cell before receipt of the current PBCH sequence by the wireless device. The correlation circuit is further configured to correlate each of the first reconstructed PBCH symbols with the current PBCH symbols to determine a correlation factor for each of the subcarriers. The parameter circuit is configured to determine a peak-to-average ratio (PAR) of a power of the correlation factors based on the correlation factors. The cancellation circuit is configured to cancel aggressor cell interference from the current PBCH symbols based on the first reconstructed PBCH symbols if the PAR exceeds a threshold.

DETAILED DESCRIPTION

The solution presented herein provides Interference Cancellation (IC) for a Physical Broadcast Channel (PBCH) as implemented by a wireless device. As used herein, "wireless device" includes any device capable of wireless communications, including but not limited to, mobile devices, user equipment, machine-to-machine (M2M) devices, etc. For simplicity, the solution will be described in terms of a UE. It will be appreciated, however, that the solution presented herein applies to any wireless device.

Figure 1:
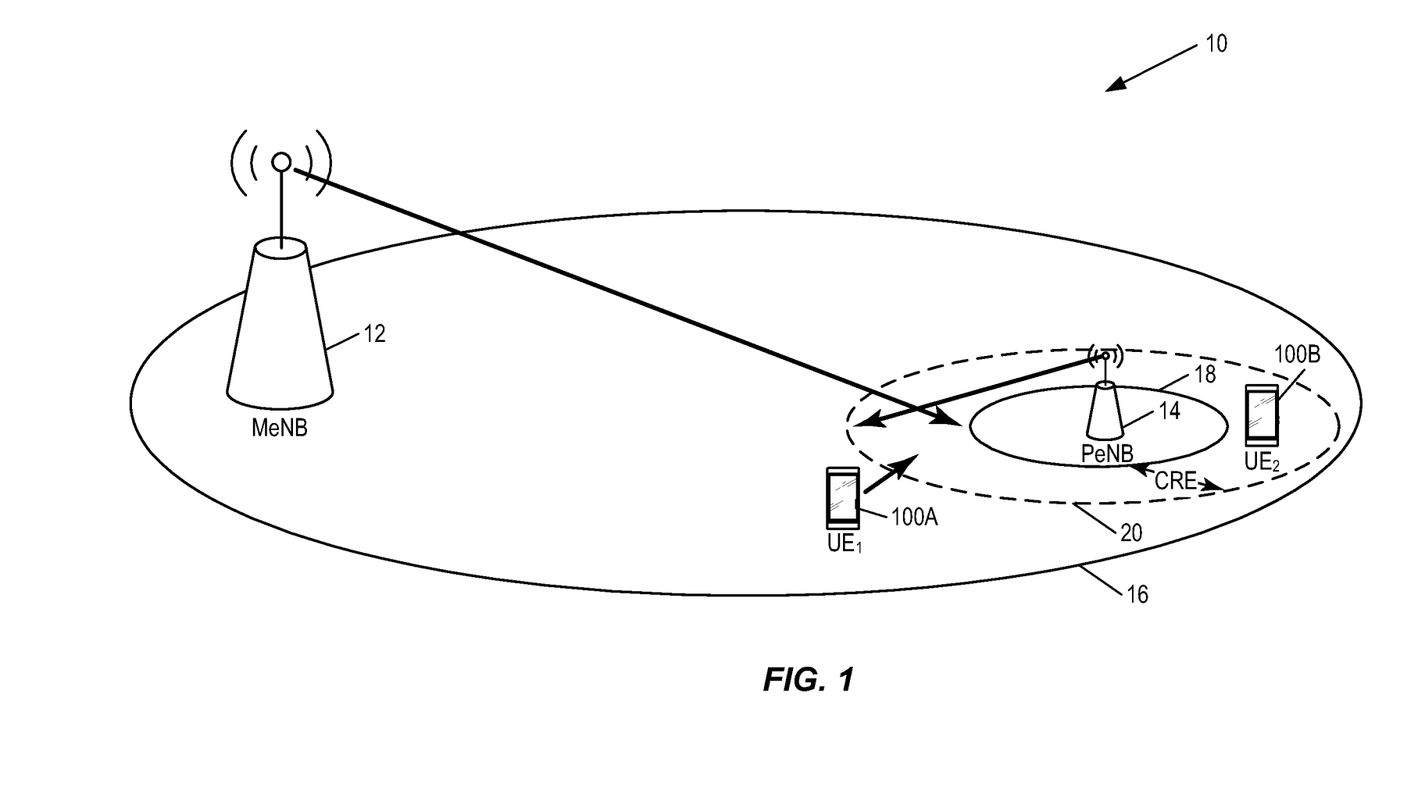
FIG. 1 shows an exemplary HetNet.

FIG. 1 shows an exemplary HetNet 10 comprising a macrocell network node 12 (e.g., a MeNodeB or MeNB), a picocell network node 14 (e.g., a PeNodeB or PeNB), and multiple UEs 100. Macrocell network node 12 provides wireless/cellular communicates to a relatively large "macro" cell 16. Picocell network node 14 provides wireless/cellular communications to a smaller "pico" cell 18 within the macrocell 16. The exemplary HetNet 10 biases handover towards the picocell network node 14, and thus designates a Cell Range Extension (CRE) zone around the picocell 18.

In a first case, $UE_1$ 100A moves from the macrocell 16 (e.g., an aggressor cell) into the picocell 18. Because the power of the macrocell network node 12 is very strong when $UE_1$ 100A moves into the CRE zone 20, $UE_1$ 100A cannot decode the PBCH for the picocell 18 accurately.

In a second case, $UE_2$ 100B is located in the CRE zone 20 of the picocell 18 after $UE_2$ 100B is offloaded from the macrocell 16. When $UE_2$ 100B powers on or when the Master Information Block (MIB) in the PBCH transmitted by the picocell network node 14 changes, $UE_2$ 100B needs to detect the MIB for the picocell network node 14. In this case, the PBCH transmitted by the macrocell network node 12 will be almost as strong as the PBCH transmitted by the picocell network node 14 at some locations in the CRE 20. $UE_2$ 100B therefore cannot decode the picocell PBCH accurately because of the strong interference from the macrocell PBCH. Thus, it is desirable to cancel the interference caused by the aggressor cell PBCH from the serving cell PBCH, which is referred to herein as PBCH-IC.

Figure 3:
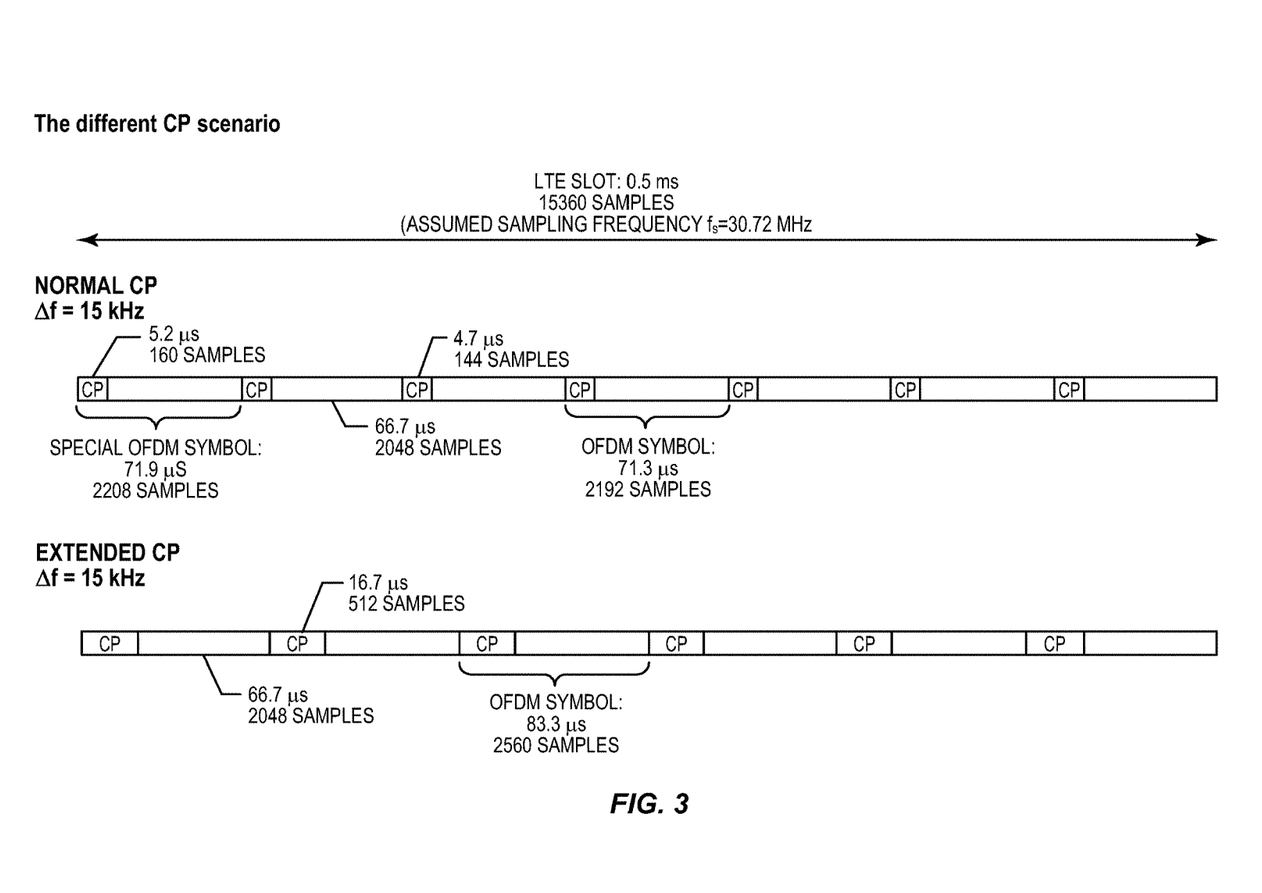
FIG. 3 shows exemplary OFDM symbols with from different cells having different cyclic prefixes.

There are two scenarios to be considered when performing PBCH-IC. In a first scenario, Orthogonal Frequency Division Multiplexed (OFDM) symbols from different cells have the same cyclic prefix, and thus have the same timing positions. Thus, the PBCH symbols from different cells will be time aligned in the frequency domain. In a second scenario, shown in FIG. 3, OFDM symbols from different cells have different cyclic prefixes, and thus have different timing positions. Thus, the PBCH symbols from different cells will not be time aligned in the frequency domain. It is desirable to develop a PBCH-IC technique applicable to both scenarios.

In order to perform PBCH-IC, the aggressor cell PBCH must first be determined. Conventional techniques for determining the aggressor cell PBCH require performing aggressor cell PBCH decoding for each occurrence of PBCH-IC. In some cases, such decoding does not produce an accurate aggressor cell PBCH, e.g., when the powers of the serving cell PBCH and the aggressor cell PBCH are equally strong. Further, performing such decoding in each PBCH-IC execution is computationally expensive.

The solution presented herein overcomes these problems by providing an accurate and efficient method and apparatus for detecting one or more aggressor cell PBCHs, and thus for cancelling such aggressor cell PBCH(s) from the serving cell PBCH. When multiple aggressor cell PBCHs are present in a received PBCH, the disclosed solution may be used to reconstruct each aggressor cell PBCH, serially or in parallel, so that all of the aggressor cell PBCHs may be cancelled from the serving cell PBCH. For example, when there is more than one aggressor cell, each aggressor cell PBCH may be reconstructed serially. In this case, the aggressor cell having the highest Reference Signal Received Power (RSRP) at the wireless device may be reconstructed first. Thus, the solution presented herein applies to situations with one or more aggressor cells. For simplicity, the following discussions label macrocell 16 and picocell 18 as the aggressor and serving cells, respectively. It will be appreciated that either cell may fulfill either roll, depending on which cell is actively serving the UE 100.

Figure 2:
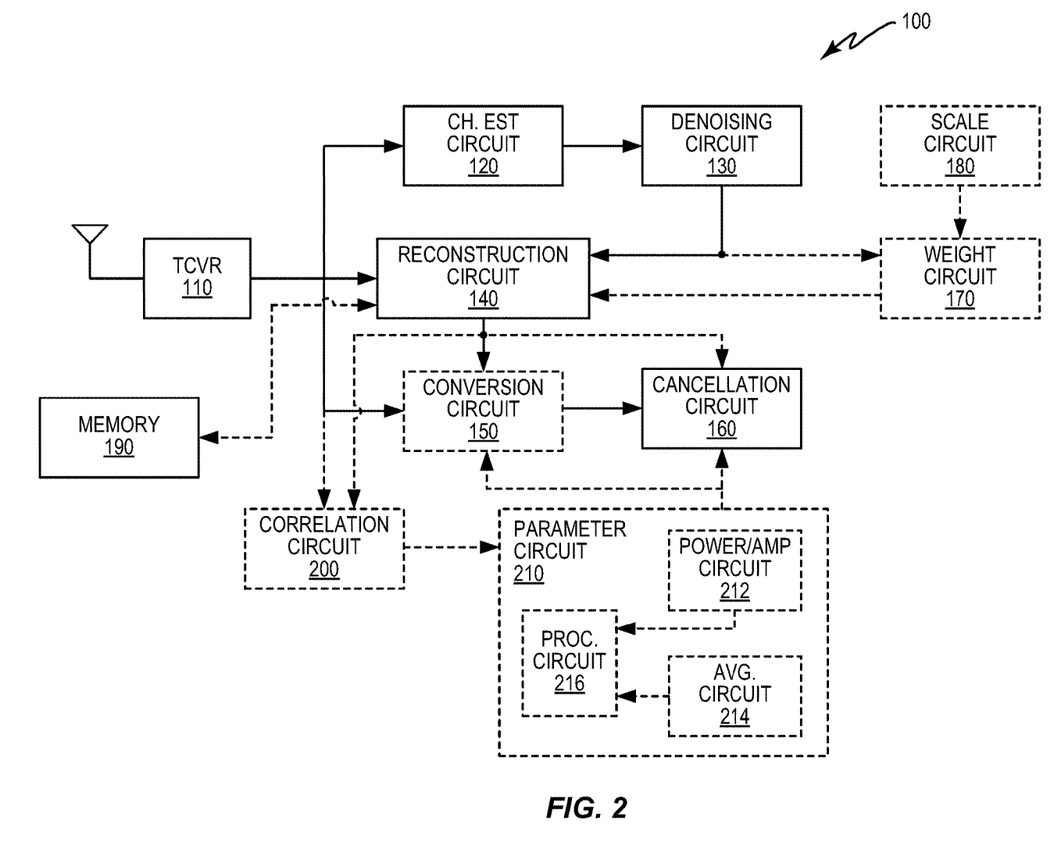
FIG. 2 shows a block diagram of a wireless device according to one exemplary embodiment.
Figure 4:
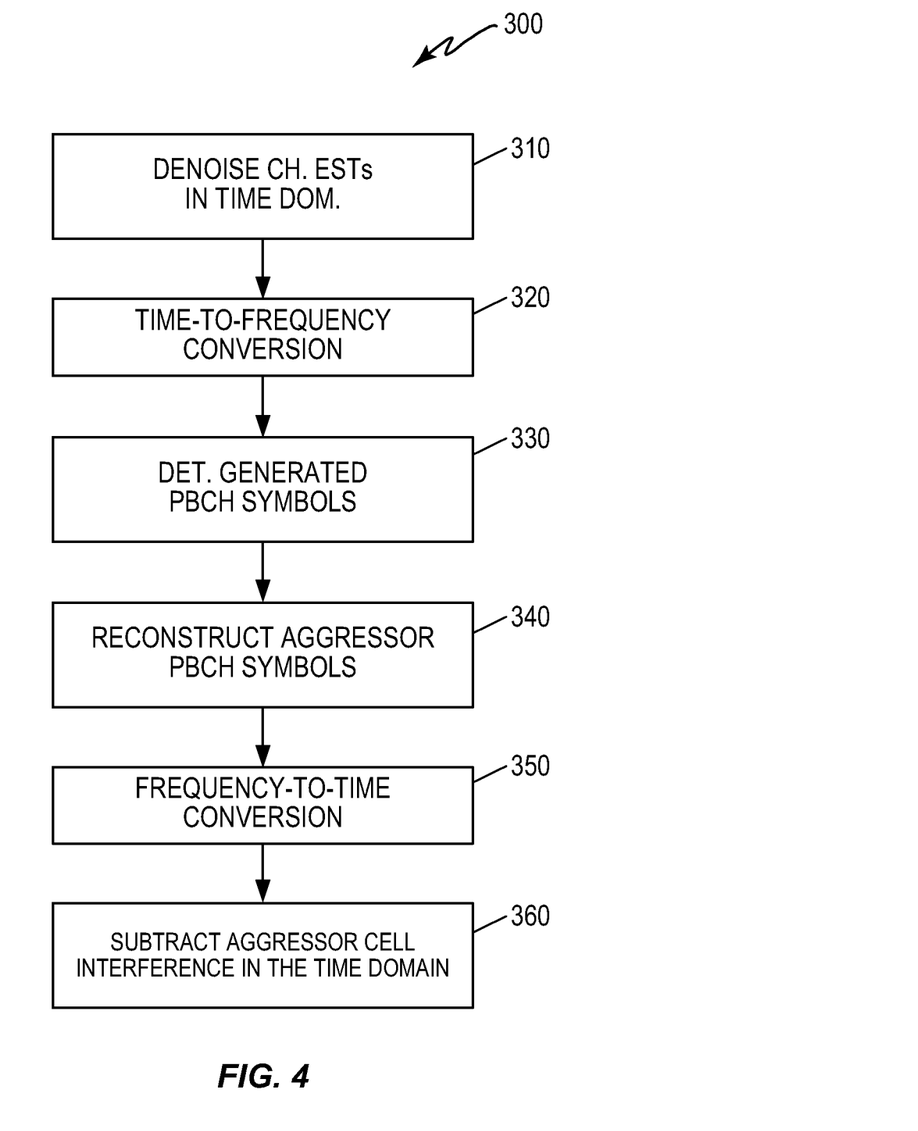
FIG. 4 shows a PBCH-IC process according to one exemplary embodiment.

FIG. 4 shows one PBCH-IC method 300, as performed by the UE 100 of FIG. 2, according to one exemplary embodiment. UE 100 comprises a transceiver 110, channel estimation circuit 120, denoising circuit 130, reconstruction circuit 140, conversion circuit 150, cancellation circuit 160, and memory 190. Transceiver 110 receives a signal via one or more wireless antennas. The transceiver 110 comprises RF and digital baseband circuits, e.g., amplifier(s), analog-to-digital converter(s), time/frequency domain conversion circuit(s), etc., and outputs the received signal in the time domain and/or in the frequency domain. The received signal output by the transceiver 110 includes a PBCH sequence in the time domain. The received PBCH sequence is a combination of a serving cell PBCH sequence transmitted by the serving cell node (e.g., PeNB network node 14) and one or more aggressor cell PBCHs transmitted by the corresponding aggressor cell node(s) (e.g., MeNB network node 12). Each of the PBCH sequences in the received PBCH sequence includes an MIB for the corresponding cell. The UE 100 may store the MIB(s) and the received PBCH sequence in memory 190 for future use. If the memory 190 does not already contain the MIB for an aggressor cell, the PBCH symbols are demodulated and decoded according to any known means to obtain the aggressor cell MIB, which is subsequently stored in memory 190.

Generally, the method 300 of FIG. 4 involves two main components: reconstruction of the aggressor cell PBCH symbols (blocks 310-340) and interference cancellation (blocks 350-360). More particularly, channel estimator 120 determines channel estimates for each aggressor cell 16 based on a reference signal in the received signal, e.g., a pilot signal or some other reference. Denoising circuit 130 applies a denoise process to the aggressor cell channel estimates in the time domain (block 310). The applied denoise process may comprise any known denoising process that removes noise from the channel estimates. Exemplary denoise processes include but are not limited to, threshold-based noise cancellation processes, tail-cut noise cancellation processes, etc. For example, a tail-cut noise cancellation process cuts a tail window of the power delay profile of the channel estimates, which mostly consists of noise, to remove noise from the channel estimates. As another example, the threshold-based noise cancellation process sets the results of a power delay profile of the channel estimates to zero wherever the power delay profile is lower than a threshold, e.g., a threshold calculated based on SNR. The denoising circuit 130 further converts the denoised channel estimates from the time domain to the frequency domain, e.g., using a Fast Fourier Transform (FFT) operation (block 320). Reconstruction circuit 140 reconstructs the aggressor PBCH symbols for the aggressor cell(s) 16 in the frequency domain. To that end, reconstruction circuit 140 determines aggressor PBCH symbols in the frequency domain for each aggressor cell 16 based on the corresponding aggressor cell MIB (block 330), which was previously decoded and stored in memory 190. The reconstruction circuit 140 then reconstructs the aggressor PBCH symbols for each aggressor cell in the frequency domain based on the corresponding denoised frequency domain channel estimates and the corresponding determined aggressor PBCH symbols (block 340). Conversion circuit 150 converts the reconstructed aggressor PBCH symbols from the frequency domain to the time domain, e.g., using an Inverse FFT (IFFT) operation to generate a reconstructed PBCH sequence (block 350). Cancellation circuit 170 then subtracts the reconstructed PBCH sequence from the received PBCH sequence in the time domain to cancel the aggressor cell interference (block 360). Because the PBCHs for the aggressor cell(s) are generated and reconstructed in the frequency domain, but the cancellation occurs in the time domain, the PBCH-IC method 300 works well for both same and different cyclic prefix scenarios. In particular, because the PBCH symbols of the aggressor and serving cells are not time aligned in the frequency domain when the cyclic prefixes are different, frequency domain subtraction of the aggressor cell PBCH symbols only works for the scenarios where the cyclic prefixes are the same. However, because the aggressor and serving cell signals are mixed in the transceiver 110 in the time domain, regardless of whether the cyclic prefixes are the same or different, the time domain cancellation of the aggressor cell interference of method 300 works independent of the type of cyclic prefix scenario.

The following mathematical analysis provides more details regarding one exemplary way to implement the PBCH-IC solution of FIG. 4. Assume a signal received by the UE 100 contains additional white noise as well as mixed signals from a serving cell 18 and one or more aggressor cells 16, e.g., as would be the case for $UE_2$ 100B in HetNet 10 of FIG. 1. In this case, transceiver 110 converts the received signal from the time domain to the frequency domain, e.g., using an FFT circuit, to produce the received symbols R(k, l) in the frequency domain for the $k^{th}$ subcarrier and the $l^{th}$ OFDM symbol, where R(k, l) may be represented by:

$$R(k, l) = \underbrace{H_1(k, l)D_1(k, l)}_{serving\ cell} + \underbrace{\sum_{j=2}^{N_{cell}} H_j(k, l)D_j(k, l)}_{aggressor\ cells} + \underbrace{N(k, l)}_{noise}, \quad (1)$$

where $H_j(\square)$ represents the frequency domain channel estimates for the $j^{th}$ cell (where j=1 represents the serving cell 18), $D_j(\square)$ represents the transmitted symbols for the $j^{th}$ cell, N(k, l) represents the additional white noise, and $N_{cell}$ represents the total number of cells, including one serving cell 18 and $N_{cell}-1$ aggressor cells 16. Thus, in Equation (1), the first item of the summation corresponds to the wanted symbols from the serving cell 18, the second item of the summation represents the sum of the interferences from the aggressor cell(s) 16, and the third item of the summation represents the additional white noise.

When the aggressor cell MIB is decoded correctly, e.g., in transceiver 110, the reconstruction circuit 140 can determine local aggressor PBCH symbols transmitted by the aggressor cell 16 based on the decoded MIB. Then, by using the determined local aggressor PBCH symbols and the aggressor cell channel estimates, the reconstruction circuit 140 generates reconstructed aggressor PBCH symbols (in the frequency domain) with channel distortion according to:

$$R_{icell}(k, l) = \sum_{j=2}^{N_{cell}} W_j(k, l)D_{j,PBCH}(k, l), \quad (2)$$

where $R_{icell}(\square)$ represents the summation of all reconstructed aggressor PBCH symbols, $W_j(\square)$, represents a weight matrix of the $j^{th}$ cell determined based on the denoised channel estimates, and $D_{j,PBCH}(\square)$ represents the determined local aggressor PBCH symbols.

In another embodiment, reconstruction circuit 140 may further include interferences on the serving cell PBCH from the Cell-specific Reference Signal (CRS) Resource Elements (REs) of the aggressor cell(s) in the reconstructed aggressor PBCH symbols according to:

$$R_{icell}(k, l) = \sum_{j=2}^{N_{cell}} W_j(k, l)(D_{j,CRS}(k_{CRS}, l_{CRS}) + D_{j,PBCH}(k, l)) \quad (3)$$

where $D_{j,CRS}(k_{CRS}, l_{CRS})$ represents the CRS RE interference of the $j^{th}$ cell for the $k_{CRS}^{th}$ subcarrier and the $l_{CRS}^{th}$ OFDM symbol in which the CRS RE is allocated. In this case, the reconstruction circuit 140 considers the effects of an RE of the aggressor cell 16 shifted with respect to a CRS shift. Thus, because CRS REs are inserted into the PBCH symbol when each PBCH symbol is generated, Equation (3) handles well different situations where the UE 100 is located at different relative positions of the CRS from the different cells. When the UE 100 has more than one receive antenna, Equation (3) may be alternately presented as:

$$R_{j,n,icell}(k, l) = \sum_{p=1}^{N_{txAnt}} W_{j,n,p}(k, l)(D_{j,p,CRS}(k_{CRS}, l_{CRS}) + D_{j,p,PBCH}(k, l)), \quad (4)$$

where p and n represents the transmit antenna number and receive antenna number, respectively. Equation (4) provides the reconstructed aggressor PBCH symbols received at the $n^{th}$ receive antenna from all of the $N_{txAnt}$ transmit antennas.

In any event, conversion circuit 150 transforms $R_{icell}(\square)$, e.g., from Equations (2), (3), or (4), to the time domain to generate the total PBCH sequence $r_{icell}(l)$ for the aggressor cell(s). For example, conversion circuit 150 may apply an IFFT operation or process to $R_{icell}(\square)$ according to:

$$r_{icell}(l) = [\Delta, IFFT(R_{icell}(k,l))], \quad (5)$$

where $r_{icell}(l)$ represents the $l^{th}$ OFDM sequence of the summation of all reconstructed aggressor PBCHs in the time domain and $\Delta$ represents the cyclic prefix of the current OFDM sequence. The conversion circuit 150 then determines the reconstructed aggressor PBCH sequence $\tilde{r}_{icell}$ by grouping the PBCH sequences into a concatenated aggressor PBCH sequence in the time domain, e.g., according to:

$$\tilde{r}_{icell} = [r_{icell}(l), r_{icell}(l+1), r_{icell}(l+2), r_{icell}(l+3)]. \quad (6)$$

Cancellation circuit 160 subsequently subtracts the aggressor PBCH sequence $\tilde{r}_{icell}$ from the received PBCH sequence $r_{PBCH}$ to determine the serving cell PBCH $r_{cancel}$ according to:

$$r_{cancel} = r_{PBCH} - \tilde{r}_{icell}. \quad (7)$$

Optionally, the interference-free PBCH from the serving cell may be further transformed from the time domain to the frequency domain to determine the PBCH symbols $R_{cancel}(k, l)$ of the serving cell, e.g., according to:

$$R_{cancel}(k,l) = FFT(r_{cancel}(l)). \quad (8)$$

Equations (2)-(4) all indicate a weighting of the aggressor cell PBCH symbols based on the denoised channel estimates, e.g., by multiplying each of the generated PBCH symbols with the corresponding weight to generate the reconstructed aggressor PBCH symbols. Such weighting is intended to account for different transmitter/receiver pairs, e.g., in Multiple Input, Multiple Output (MIMO) systems. The weights may be determined by the reconstruction circuit, or may be determined by a separate weight circuit 170 (FIG. 2). When there is only one transmit-receive antenna pair, the weights may be determined according to:

$$W(k, l) = \frac{DPR}{NoiseVar(k, l)} ChEst(k, l) \quad (9)$$

where W(k, l) represents the weight associated with the receive antenna, DPR represents a data-to-pilot amplitude ratio, NoiseVar(k, l) represents the noise variance at the receive antenna, and ChEst(k, l) represents the denoised channel estimates associated with the channel between the aggressor cell transmitter and the UE receiver. When there are multiple aggressor cells, the same equation is used for each aggressor cell. In another exemplary embodiment where the aggressor cell network node 12 has one transmit antenna and the UE 100 has two receive antennas, e.g., Transmission Mode 1 (TM1), the weighting matrix may be determined according to:

$$\begin{bmatrix} W_0(k,l) \\ W_1(k,l) \end{bmatrix} = \begin{bmatrix} \dfrac{DPR}{\text{NoiseVar}_0(k,l)} ChEst_0(k,l) \\ \dfrac{DPR}{\text{NoiseVar}_1(k,l)} ChEst_1(k,l) \end{bmatrix} \quad (10)$$

where $W_0(k, l)$ represents the weight associated with the first receive antenna, $W_1(k, l)$ represents the weight associated with the second receive antenna, DPR represents the data-to-pilot amplitude ratio, $\text{NoiseVar}_0(k, l)$ represents the noise variance at the first receive antenna, $\text{NoiseVar}_1(k, l)$ represents the noise variance at the second receive antenna, $ChEst_0(k, l)$ represents the denoised channel estimates associated with the channel between the aggressor cell transmit antenna and the first receiver antenna, and $ChEst_1(k, l)$ represents the denoised channel estimates associated with the channel between the aggressor cell transmit antenna and the second receive antenna.

In another exemplary embodiment associated with two transmit antennas at the aggressor cell network node 12 and two receive antennas at the UE 100, e.g., Transmission Mode 2 (TM2), the weighting matrix may be determined according to:

$$\begin{bmatrix} W_{00}(k,l) & W_{01}(k,l) \\ W_{10}(k,l) & W_{11}(k,l) \end{bmatrix} = \quad (11)$$

$$\begin{bmatrix} \dfrac{DPR}{\text{NoiseVar}_0(k,l)} & 0 \\ 0 & \dfrac{DPR}{\text{NoiseVar}_1(k,l)} \end{bmatrix} \begin{bmatrix} ChEst_{00}(k,l) & ChEst_{01}(k,l) \\ ChEst_{10}(k,l) & ChEst_{11}(k,l) \end{bmatrix}$$

where $W_{n,p}(k, l)$ represents the weight associated with the $n^{th}$ receive antenna and the $p^{th}$ transmit antenna, and $ChEst_{n,p}(k, l)$ represents the denoised channel estimates associated with the channel between the $p^{th}$ transmit antenna of the aggressor cell 16 and the $n^{th}$ receive antenna of the UE 100. It will be appreciated that Equations (9)-(11) may be extended to any number of transmit and receive antenna scenarios.

While not required, weight circuit 170 may further apply a scaling factor, e.g., as provided by scale circuit 180, to the generated aggressor cell PBCH symbols. For example, the weight circuit 170 may combine the scaling factor output by scale circuit 180 with the determined weights to adjust the signal level. In some embodiments, scale circuit 180 determines the scaling factor for each aggressor cell based on a corresponding signal quality estimate, e.g., a signal-to-interference ratio (SNR), where the scaling factor is inversely proportional to the signal quality estimate. In so doing, the weight circuit 170 normalizes the different PBCHs based on the different signal qualities associated with different aggressor cells 16.

Unlike conventional solutions, the solution of FIG. 4 is able to cope with different cyclic prefix configuration scenarios, which enhances the flexibility of PBCH-IC in a HetNet. Further, using the joint frequency and time domain processing reduces processing complexity by eliminating the processing intensive convolution operation that would be required if the processing was performed only in the time domain for different cyclic prefix configuration scenarios. In addition, the ability to cope with different CRS relative positions, e.g., both colliding and non-colliding CRS cases, enhances the flexibility of the disclosed PBCH-IC. Further, the use of a denoising circuit 130 to denoise the aggressor cell channel estimates before reconstructing the aggressor PBCH symbols improves the accuracy of the channel estimates, and therefore improves the accuracy of the disclosed reconstructed aggressor cell PBCH symbols and the disclosed PBCH-IC.

Figure 5:
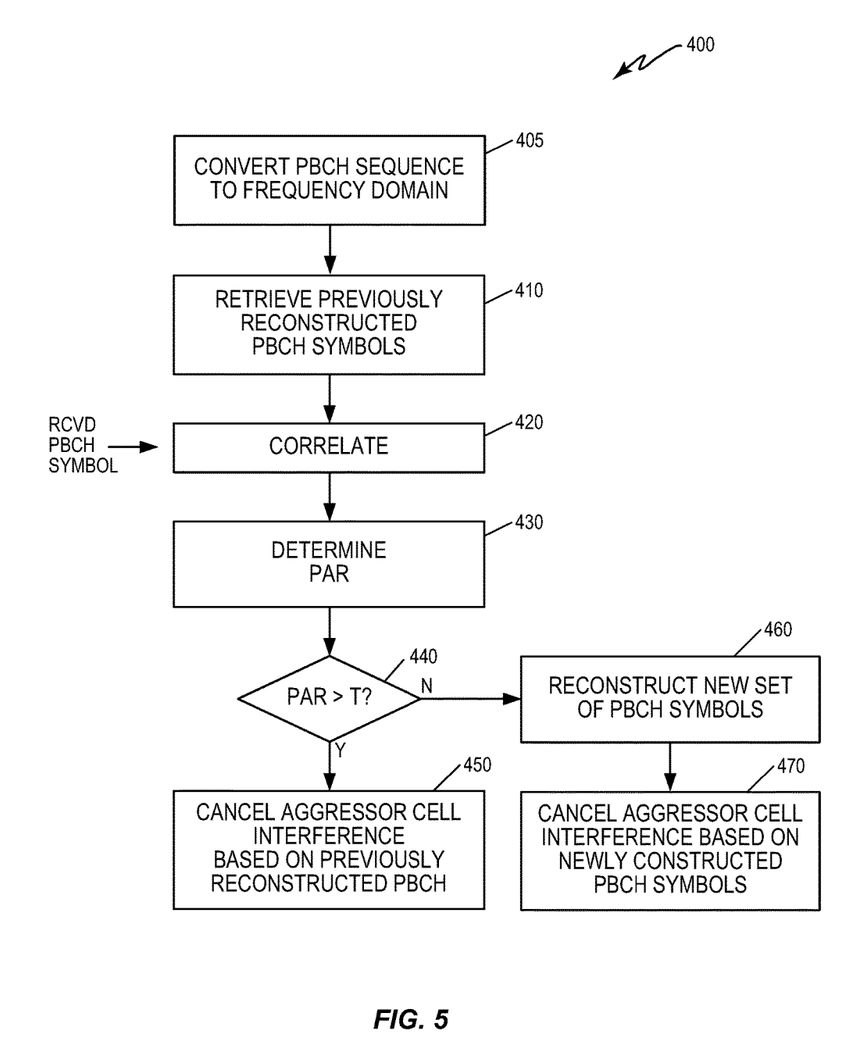
FIG. 5 shows another PBCH-IC process according to one exemplary embodiment.

FIG. 5 shows one PBCH-IC method 400, as performed by a UE 100, according to another exemplary embodiment. The method 400 of FIG. 5 takes advantage of the fact the PBCH is often static or infrequently updated. Accordingly, the UE 100 first determines whether the PBCH has changed (blocks 405-430). Generally, the UE 100 uses a correlation technique executed in the power domain coupled with a peak-to-average ratio (PAR) metric to make this decision. Depending on whether the PBCH has changed (block 440), the UE 100 cancels the aggressor cell PBCH from the received PBCH using previously reconstructed PBCH symbols (e.g., first reconstructed PBCH symbols) or using newly reconstructed PBCH symbols (e.g., second reconstructed PBCH symbols) (blocks 450-470), where the process of FIG. 4 may be used to determine the newly reconstructed PBCH symbols and/or the previously reconstructed PBCH symbols. For this embodiment, the UE 100 may also or alternatively include a correlation circuit 200 and a parameter circuit 210 along with the cancelation circuit 160. Because this solution uses previously reconstructed aggressor PBCH symbols to cancel aggressor cell interference, this solution does not need to decode the aggressor PBCH symbols each time PBCH-IC is executed, and thus, saves significant processing resources. Further, when the signals of the serving cell and the aggressor cell have almost the same power, this solution provides comparable or better results than conventional PBCH-IC solutions, which rely on PBCH decoding (see FIG. 6).

More particularly, transceiver 110 receives a current PBCH sequence for the current time period, and converts the received current PBCH sequence from a time domain to a frequency domain to generate current PBCH symbols (block 405). Correlation circuit 200 retrieves previously reconstructed aggressor PBCH symbols associated with the aggressor cell for each subcarrier from memory 190 (block 410). These previously reconstructed aggressor PBCH symbols were reconstructed from a PBCH sequence received by the UE 100 any time before a current time period. The correlation circuit 200 correlates each of the previously reconstructed aggressor PBCH symbols with the current PBCH symbols to determine a correlation factor for each subcarrier (block 420). The parameter circuit 210 determines a peak-to-average ratio (PAR) of a power of the correlation factors based on the correlation factors provided by the correlation circuit 200 (block 430). If the PAR exceeds a threshold (T) (block 440), which may be predetermined, e.g., by simulations, the UE 100 determines the PBCH has not changed. Thus, the previously or past reconstructed aggressor PBCH symbols (retrieved from memory 190) can be used to cancel the aggressor cell interference from the PBCH symbols of the received current PBCH (block 450). If, however, the PAR does not exceed the threshold (block 440), the UE 100 newly reconstructs the aggressor PBCH symbols from the received current PBCH sequence. UE 100 uses the newly reconstructed aggressor PBCH symbols to cancel the aggressor cell interference from the received current PBCH. In one exemplary embodiment, the UE 100 may newly reconstruct the aggressor PBCH symbols using the process 300 of FIG. 4 (blocks 460-470) when the PAR does not exceed the threshold (block 440). Accordingly, when the PAR does not exceed the threshold (block 440), the reconstruction circuit 140 newly reconstructs the aggressor PBCH symbols based on denoised channel estimates and a MIB for the aggressor cell (block 460). Subsequently, the cancellation circuit 160 cancels the aggressor cell interference from the received current PBCH sequence using the newly reconstructed aggressor PBCH symbols (block 470).

When the cyclic prefix of the aggressor and serving cells have different timing positions, a reconstructed (newly or previously) aggressor PBCH sequence (derived from the reconstructed aggressor PBCH symbols) is subtracted from the current received PBCH sequence in the time domain to cancel the interference. The UE 100 may obtain the CP mode, for example, during the cell search used to set up the link between the UE and the serving cell node. In this case, the reconstructed (newly or previously) PBCH symbols are first transformed to the time domain. When the cyclic prefix of the aggressor and serving cells have the same timing positions, however, the reconstructed (newly or previously) aggressor PBCH symbols may be subtracted from the current received PBCH symbols in the frequency domain. Alternatively, when the timing positions of the cyclic prefixes are the same, the reconstructed (newly or previously) aggressor PBCH sequence (derived from the reconstructed aggressor PBCH symbols) may be subtracted from the current received PBCH sequence in the time domain.

The following mathematical analysis provides more details regarding one exemplary implementation of the PBCH-IC solution presented in FIG. 5. In this example, it is assumed transceiver 110 provides the current PBCH symbols $R_{n,PBCH}$ for the currently received PBCH sequence to the correlation circuit 200, and that the correlation circuit 200 retrieves previously reconstructed aggressor PBCH symbols $R_{j,n,icell}(k)$ from memory 190. Correlation circuit 200 then correlates these two sets of symbols to determine a correlation factor $c_{j,n}(k)$ for each of the m reconstructed PBCH RE data in one PBCH transmission period of the $j^{th}$ aggressor cell and each of the n receive antennas according to:

$$c_{j,n}(m) = R_{j,n,icell}(m)^H R_{n,PBCH} \quad m=1,\ldots,721; n=0,1, \quad (12)$$

where 721 represents the length of the correlation computation. In one exemplary embodiment, $R_{j,n,icell}(m)$ represents the reconstructed aggressor PBCH symbols for four PBCH blocks, e.g.:

$$R_{j,n,icell}(m) = [r_{j,n,icell}(m), \ldots, r_{j,n,icell}(m+n_{seq}-1)],$$
$$m=1,\ldots,721; n=0,1; n_{seq}=240 \quad (13)$$

and $R_{n,PBCH}$ represents the received PBCH symbols, e.g.:

$$R_{n,PBCH} = [r_{n,PBCH}(1), \ldots, r_{n,PBCH}(n_{seq})] n=0,1;$$
$$n_{seq}=240, \quad (14)$$

where 240 represents the total number of PBCH data REs in one LTE subframe.

The parameter circuit 210 then uses the correlation factors calculated by the correlation circuit 200 to determine the PAR. To that end, parameter circuit 210 comprises a power/amplitude circuit 212, an averaging circuit 214, and a processing circuit 216. The power/amplitude circuit 212 calculates a power $r_{pow,j}(k)$ of the correlation results, e.g., according to:

$$r_{pow,j}(k) = \sum_{n=0}^{1} |c_{j,n}(k)|^2 \quad (15)$$
$$k = 1, \ldots, 721.$$

The averaging circuit 214 calculates an average power $r_{avgpow}$ according to:

$$r_{avgpow} = \frac{\sum_{k=1}^{721} r_{pow,j}(k)}{721}. \quad (16)$$

Processing circuit then computes the PAR according to:

$$PAR = \frac{\max(r_{pow,j}(k))}{r_{avgpow}} \quad (17)$$

In an alternate embodiment, the PAR may be computed based on the amplitude of the correlation factors. In this case, the power/amplitude circuit 212 computes the amplitude of the correlation factors, and these amplitudes are used in place of the $r_{pow,j}(k)$ in Equations (16) and (17). Alternatively or additionally, max $(r_{pow,j}(k))$ in Equation (17) may be replaced by a summation of some number of peaks instead of comprising a single maximum peak.

The solution of FIG. 5 promotes system efficiency and improves detection performance through the use of a correlation-based PBCH detection technique. In particular, the correlation-based PBCH detection technique enables the UE 100 to avoid the decoding and reconstructing operations when the PBCH has not changed. When the PBCH has changed over some period of time, the solution of FIG. 5 may rely on the reconstruction process of FIG. 4, and thus take advantage of the benefits provided by such a reconstruction solution.

Figure 6:
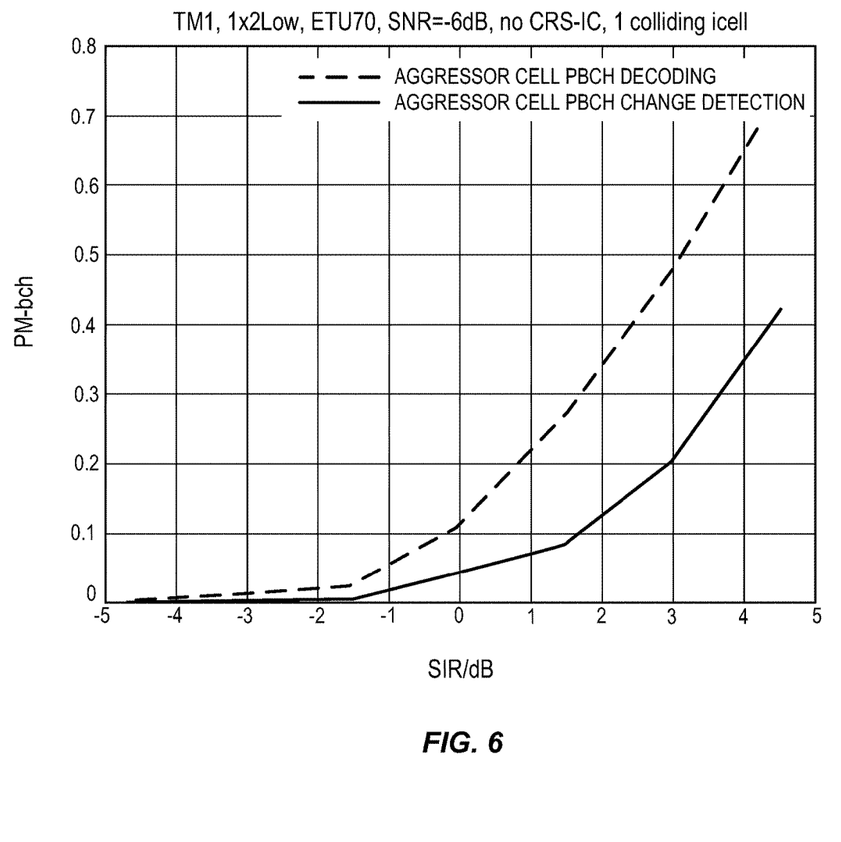
FIGS. 6 and 7 show simulation results for the disclosed PBCH-IC processes.
Figure 7:
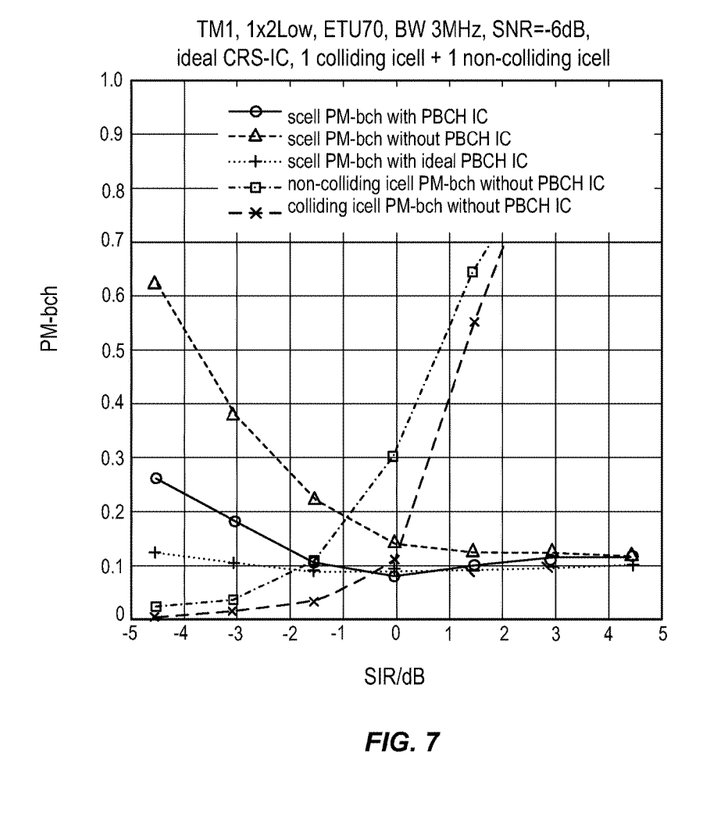

FIGS. 6 and 7 show simulation results for the solutions disclosed herein. In FIG. 6, the following simulation conditions applied:

Two colliding cells: one serving cell and one aggressor cell;
Transmission Mode 1 (TM1), with bandwidth (BW)=3 MHz;
Extended Typical Urban 70 (ETU70) channel model;
SNR=−6 dB;
Static PBCH configuration; and
Almost Blank Subframe (ABS) scenario.

FIG. 6 shows that the correlation-based aggressor cell PBCH determination (FIG. 4) has lower average probability of a miss-detection of PBCH (PM-bch) (e.g., as defined in 3GPP TS 36.101 V11.40 chapter 8.6) than the conventional aggressor cell PBCH decoding method. Thus, the reconstructed aggressor cell PBCH symbols are more accurate than that of the conventional PBCH decoding method. As a result, FIG. 6 demonstrates the improved performance of the disclosed PBCH-IC.

In FIG. 7, the following simulation conditions applied:
Transmission Mode 1 (TM1), with bandwidth (BW)=3 MHz;
ETU70 channel model;
SNR=−6 dB
Aggressor cell: no CRS-IC and no PBCH-IC;
Static PBCH configuration; and
ABS scenario.

FIG. 7 shows the PBCH performance of the serving cell can be improved by the PBCH-IC method(s) disclosed herein. In this case, the maximum performance margin is 5.3 dB.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of cancelling aggressor cell interference, in a wireless device using a joint frequency domain and time domain process, the method comprising:
   receiving a physical broadcast channel (PBCH) sequence at the wireless device from a serving cell and an aggressor cell, wherein the serving cell comprises a serving network node that serves the wireless device;
   applying a denoise process to channel estimates associated with the aggressor cell in the time domain to remove noise from the channel estimates and to determine denoised channel estimates;
   converting the denoised channel estimates from the time domain to the frequency domain to determine denoised frequency domain channel estimates;
   determining PBCH symbols generated by the aggressor cell based on a master information block corresponding to the aggressor cell in the received PBCH sequence;
   reconstructing aggressor PBCH symbols for the aggressor cell in the frequency domain based on the denoised frequency domain channel estimates and the determined PBCH symbols;
   converting the reconstructed aggressor PBCH symbols from the frequency domain to the time domain to generate a reconstructed PBCH sequence; and
   subtracting the reconstructed PBCH sequence from the received PBCH sequence in the time domain to cancel the aggressor cell interference.

2. The method of claim 1, wherein reconstructing the aggressor PBCH symbols comprises applying the denoised frequency domain channel estimates to the generated PBCH symbols to generate the reconstructed aggressor PBCH symbols.

3. The method of claim 1, further comprising determining a weight for each generated PBCH symbol based on the denoised frequency domain channel estimates, wherein reconstructing the aggressor PBCH symbols comprises multiplying each of the generated PBCH symbols with the corresponding weight to generate the reconstructed aggressor PBCH symbols.

4. The method of claim 1, further comprising:
   determining a weight for each generated PBCH symbol based on the denoised frequency domain channel estimates; and
   scaling the weights according to a scaling factor inversely proportional to a signal quality estimate associated with the generated PBCH symbols to generate scaled weights;
   wherein reconstructing the aggressor PBCH symbols comprises multiplying the generated PBCH symbols with the scaled weights to generate the reconstructed aggressor PBCH symbols.

5. The method of claim 1, wherein reconstructing the aggressor PBCH symbols in the frequency domain comprises reconstructing the aggressor PBCH symbols in the frequency domain based on the denoised frequency domain channel estimates, the generated PBCH symbols, and a resource element of the aggressor cell shifted with respect to the serving cell according to a cell-specific reference signal shift.

6. A wireless device served in a wireless network by a serving network node in a serving cell, the wireless device comprising:
   a transceiver circuit configured to
      receive a physical broadcast channel (PBCH) sequence from the serving cell and an aggressor cell;
   a denoising circuit configured to:
      apply a denoise process to channel estimates in the time domain to remove noise from the channel estimates and to determine denoised channel estimates; and
      convert the denoised channel estimates to the frequency domain to determine denoised frequency domain channel estimates;
   a reconstruction circuit configured to:
      determine PBCH symbols generated by the aggressor cell based on a master information block corresponding to the aggressor cell in the received PBCH sequence; and
      reconstruct aggressor PBCH symbols for the aggressor cell in the frequency domain based on the denoised frequency domain channel estimates and the determined PBCH symbols;
   a conversion circuit configured to
      convert the reconstructed aggressor PBCH symbols from the frequency domain to the time domain to generate a reconstructed PBCH sequence; and
   a cancellation circuit configured to
      subtract the reconstructed PBCH sequence from the received PBCH sequence in the time domain to cancel the aggressor cell interference.

7. The wireless device of claim 6, wherein the reconstruction circuit reconstructs the aggressor PBCH symbols by applying the denoised frequency domain channel estimates to the generated PBCH symbols to generate the reconstructed aggressor PBCH symbols.

8. The wireless device of claim 6, further comprising a weight circuit configured to determine a weight for each generated PBCH symbol based on the denoised frequency domain channel estimates, wherein the reconstruction circuit reconstructs the aggressor PBCH symbols by multiplying each of the generated PBCH symbols with the corresponding weight to generate the reconstructed aggressor PBCH symbols.

9. The wireless device of claim 6, further comprising:
   a weight circuit configured to determine a weight for each generated PBCH symbol based on the denoised frequency domain channel estimates; and
   a scale circuit configured to scale the weights according to a scaling factor inversely proportional to a signal quality estimate associated with the generated PBCH symbols to generate scaled weights;
   wherein the reconstruction circuit reconstructs the aggressor PBCH symbols by multiplying the generated PBCH symbols with the scaled weights to generate the reconstructed aggressor PBCH symbols.

10. The wireless device of claim 6, wherein the reconstruction circuit reconstructs the aggressor PBCH symbols in the frequency domain by reconstructing the aggressor PBCH symbols in the frequency domain based on the denoised frequency domain channel estimates, the generated PBCH symbols, and a resource element of the aggressor cell shifted with respect to a resource element of the serving cell according to a cell-specific reference signal shift.

11. A method of cancelling interference, in a wireless device using a joint frequency domain and time domain process, the method comprising:

receiving a current physical broadcast channel (PBCH) sequence at the wireless device from a serving cell and an aggressor cell, wherein a serving network node in the serving cell serves the wireless device;

converting the received current PBCH sequence from the time domain to the frequency domain to generate current PBCH symbols;

reconstructing PBCH symbols generated by the aggressor cell before receipt of the current PBCH sequence by the wireless device;

storing the reconstructed PBCH symbols in a memory in the wireless device;

retrieving the reconstructed PBCH symbols associated with the aggressor cell for each subcarrier of the PBCH in the frequency domain from the memory in the wireless device;

correlating each of the reconstructed PBCH symbols with the current PBCH symbols to determine a correlation factor for each of the subcarriers;

determining a peak-to-average ratio (PAR) of a power of the correlation factors based on the correlation factors; and if the PAR exceeds a threshold, cancelling aggressor cell interference from the current PBCH symbols based on the reconstructed PBCH symbols.

12. The method of claim 11, wherein determining the PAR comprises:

determining, for each of the subcarriers, a power of at least one correlation factor based on the corresponding correlation factor;

averaging the determined powers to determining an average power;

identifying a maximum of the determined powers as a maximum power; and dividing the maximum power by the average power to determine the PAR.

13. The method of claim 11, wherein determining the PAR comprises:

determining, for each of the subcarriers, an amplitude based on the corresponding correlation factor;

averaging the determined amplitudes to determining an average amplitude;

identifying a maximum of the determined amplitudes as a maximum amplitude; and dividing the maximum amplitude by the average amplitude to determine the PAR.

14. The method of claim 11, wherein cancelling the aggressor cell interference if the PAR exceeds the threshold comprises:

converting the first reconstructed PBCH symbols from the frequency domain to the time domain to generate a first reconstructed PBCH sequence; and subtracting the first reconstructed PBCH sequence from the received current PBCH sequence in the time domain.

15. The method of claim 11, wherein cancelling the aggressor cell interference if the PAR exceeds the threshold comprises subtracting the first reconstructed PBCH symbols from the current PBCH symbols in the frequency domain.

16. The method of claim 11, further comprising:

if the PAR does not exceed the threshold, determining second reconstructed PBCH symbols based on denoised channel estimates and a master information block in the received current PBCH sequence, the master information block corresponding to the aggressor cell; and cancelling the aggressor cell interference from the current PBCH symbols based on the second reconstructed PBCH symbols if the PAR does not exceed the threshold.

17. The method of claim 16, wherein determining the second reconstructed PBCH symbols comprises:

applying a denoise process to channel estimates in a time domain to remove noise from the channel estimates to determine denoised channel estimates;

converting the denoised channel estimates from the time domain to the frequency domain to determined denoised frequency domain channel estimates; and determining generated PBCH symbols for the aggressor cell based on the master information block corresponding to the aggressor cell in the received current PBCH sequence;

determining the second reconstructed PBCH symbols in the frequency domain based on the denoised frequency domain channel estimates and the generated PBCH symbols.

18. The method of claim 17, further comprising converting the second reconstructed PBCH symbols from the frequency domain to the time domain to generate a second reconstructed PBCH sequence, wherein cancelling the aggressor cell interference if the PAR does not exceed the threshold comprises subtracting the second reconstructed PBCH sequence from the received current PBCH sequence in the time domain.

19. The method of claim 17, wherein cancelling the aggressor cell interference if the PAR does not exceed the threshold comprises subtracting the second reconstructed PBCH symbols from the current PBCH symbols in the frequency domain.

20. A wireless device served in a wireless network by a serving network node in a serving cell, the wireless device comprising:

a memory;

a transceiver configured
to receive a current physical broadcast channel (PBCH) sequence from the serving cell and an aggressor cell, and
to convert the received current PBCH sequence from the time domain to the frequency domain to generate current PBCH symbols;

a correlation circuit configured to:
reconstruct PBCH symbols generated by the aggressor cell before receipt of the current PBCH sequence by the wireless device;
store the reconstructed PBCH symbols in the memory in the wireless device;
retrieve the reconstructed PBCH symbols associated with the aggressor cell for each subcarrier of the PBCH in the frequency domain from the memory; and
correlate each of the reconstructed PBCH symbols with the current PBCH symbols to determine a correlation factor for each of the subcarriers;

a parameter circuit configured to
determine a peak-to-average ratio (PAR) of a power of the correlation factors based on the correlation factors; and a cancellation circuit configured to
cancel aggressor cell interference from the current PBCH symbols based on the reconstructed PBCH symbols if the PAR exceeds a threshold.

21. The wireless device of claim 20, wherein the parameter circuit comprises:
   a power circuit configured to determine, for each of the subcarriers, a power of at least one correlation factor based on the corresponding correlation factor;
   an average circuit configured to average the determined powers to determining an average power; and
   a processing circuit configured to divide a maximum one of the determined powers by the average power to determine the PAR.

22. The wireless device of claim 20, wherein the parameter circuit comprises:
   an amplitude circuit configured to determine, for each of the subcarriers, an amplitude based on the corresponding correlation factor;
   an average circuit configured to average the determined amplitudes to determining an average amplitude; and
   a processing circuit configured to divide a maximum one of the determined amplitudes by the average amplitude to determine the PAR.

23. The wireless device of claim 20, further comprising a conversion circuit configured to convert the first reconstructed PBCH symbols from the frequency domain to the time domain to generate a first reconstructed PBCH sequence, wherein the cancellation circuit cancels the aggressor cell interference from the received PBCH symbols if the PAR exceeds the threshold by subtracting the first reconstructed PBCH sequence from the received current PBCH sequence in the time domain.

24. The wireless device of claim 20, wherein the cancellation circuit cancels the aggressor cell interference from the current PBCH symbols if the PAR exceeds the threshold by subtracting the first reconstructed PBCH symbols from the current PBCH symbols in the frequency domain.

25. The wireless device of claim 20, wherein the cancellation circuit is further configured to cancel the aggressor cell interference from the current PBCH symbols if the PAR does not exceed the threshold based on second reconstructed PBCH symbols, wherein the second reconstructed PBCH symbols are determined based on denoised channel estimates and a master information block in the received current PBCH sequence, the master information block corresponding to the aggressor cell.

26. The wireless device of claim 25, further comprising:
   a denoising circuit configured to:
      apply a denoise process to channel estimates in a time domain to remove noise from the channel estimates to determine the denoised channel estimates; and
      convert the denoised channel estimates from the time domain to the frequency domain to determined denoised frequency domain channel estimates; and
   a reconstruction circuit configured to:
      determine generated PBCH symbols for the aggressor cell based on the master information block corresponding to the aggressor cell in the received current PBCH sequence; and
      determine the second reconstructed PBCH symbols in the frequency domain based on the denoised frequency domain channel estimates and the generated PBCH symbols.

27. The wireless device of claim 26, further comprising a conversion circuit configured to convert the second reconstructed PBCH symbols from the frequency domain to the time domain to generate a second reconstructed PBCH sequence, wherein the cancellation circuit cancels the aggressor cell interference if the PAR does not exceed the threshold by subtracting the second reconstructed PBCH sequence from the received current PBCH sequence in the time domain.

28. The wireless device of claim 26, wherein the cancellation circuit cancels the aggressor cell interference from the current PBCH symbols if the PAR does not exceed the threshold by subtracting the second reconstructed PBCH symbols from the current PBCH symbols in the frequency domain.

* * * * *